United States Patent

[11] 3,620,706

| [72] | Inventor | Louis Spanoudis<br>Toledo, Ohio |
|---|---|---|
| [21] | Appl. No. | 690,043 |
| [22] | Filed | Nov. 20, 1967 |
| [45] | Patented | Nov. 16, 1971 |
| [73] | Assignee | Owens-Illinois, Inc. |

[54] METHOD OF THERMAL TEMPERING TRANSPARENT GLASS BODIES
1 Claim, 3 Drawing Figs.

[52] U.S. Cl. ................................................... 65/114, 65/104
[51] Int. Cl. ........................................................ C03b 27/00
[50] Field of Search ........................................... 65/114, 115, 104, DIG. 4

[56] References Cited
UNITED STATES PATENTS
3,258,972  7/1966  Cassaday et al. ............. 65/115 X
2,924,695  2/1960  Atkeson ....................... 65/114 X
3,260,584  7/1966  Badger ........................ 65/114 X

OTHER REFERENCES

"Infrared" by L. R. Koller in General Electric Review, March 1941, pp. 167– 173, 65– DIG. 4.

Primary Examiner—Arthur O. Kellogg
Attorneys—T. A. Meehan and W. A. Schaich

ABSTRACT: This invention relates to an improved method for effecting the thermal tempering of a transparent glass body, particularly a body having walls of varying thickness, by subjecting such body to shortwave infrared energy to which the body is substantially transparent, so that absorption of such radiation occurs throughout the entire mass of the glass body. When the glass body is thus uniformly heated to a desired temperature, it is quenched by subjecting the body to the action of a cooling fluid.

INVENTOR.
LOUIS SPANOUDIS
BY W. A. Schaich &
Thomas A. Meehan
ATTORNEYS

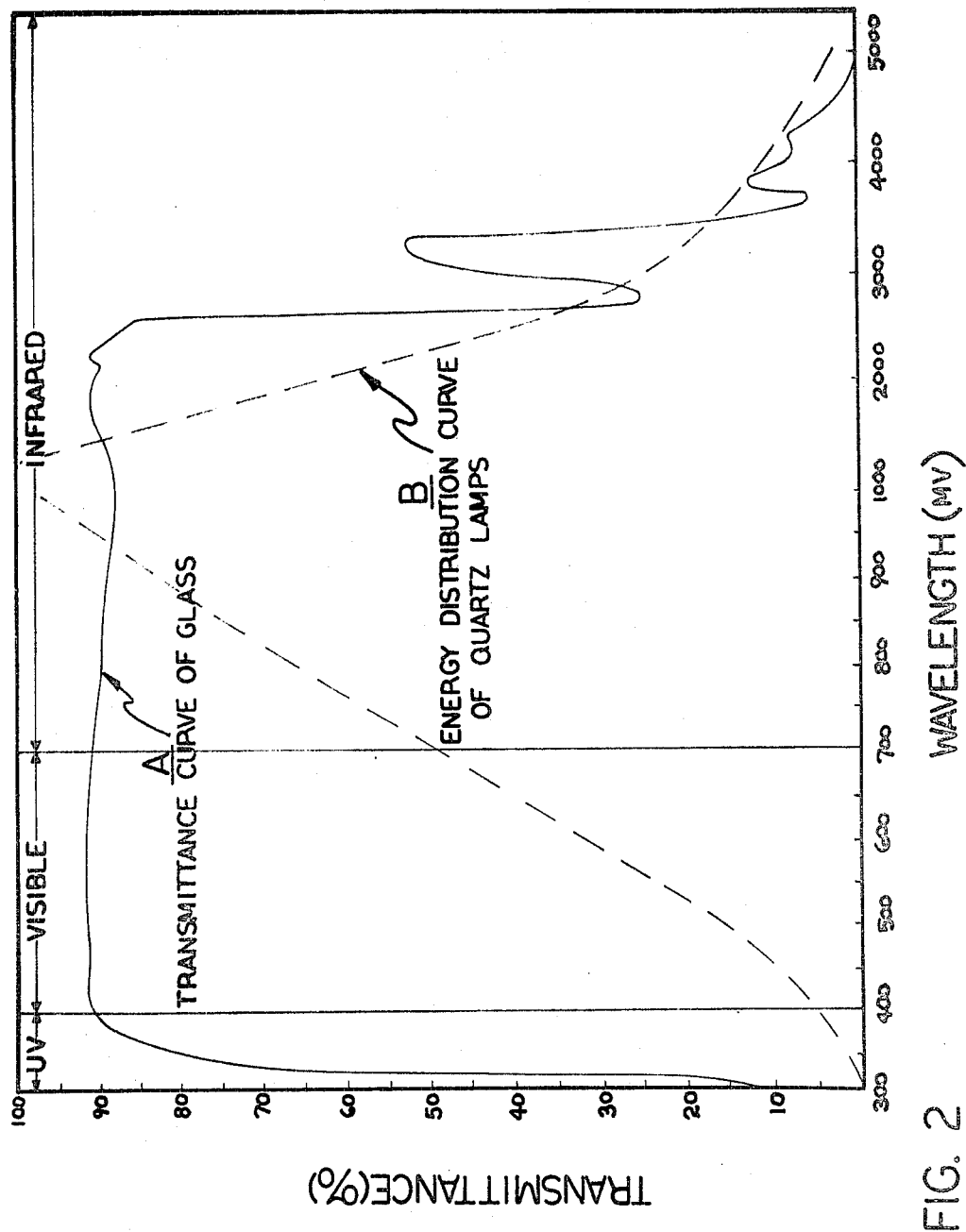

METHOD OF THERMAL TEMPERING TRANSPARENT GLASS BODIES

This invention relates to an improved method for thermal tempering glass articles, and particularly glass articles having walls of varying thicknesses.

There are many examples in the prior art of thermal tempering processes which commonly involve heating the glass article by means of burners, furnaces, lehrs, or by subjecting the article to long wave infrared energy. In all of these prior art approaches, it was inherent that the surface of the glass was heated to a far greater degree than the inner glass. The bulk of the glass article or body was, therefore, primarily heated by conduction which, in glass, is a relatively slow heating process. As a result, in order to achieve economically feasible thermal tempering cycles, the glass body had to be subjected to temperatures which were far in excess of the deformation temperature of the glass with the result that, when the glass article had wall portions of varying thicknesses, the thin-walled portions would often be heated beyond the deformation point before the bulk of the article was heated above the strain point of the glass. This failure to achieve a uniform temperature condition in the glass, except through utilization of extremely long and uneconomical heating cycles, not only made thermal tempering uneconomical to practice on a commercial basis, but also resulted in erratic properties of the tempered glass due to the temperature differential between various portions of the glass article. It is, accordingly, an object of this invention to provide an improved process for thermal tempering glass articles. More particularly, it is an object of this invention to provide a commercially practical thermal tempering process for transparent glass articles having walls of varying thickness.

The specific nature of this invention, as well as other advantages thereof, will be apparent to those skilled in the art from the following detailed description taken in conjunction with the annexed drawings on which there are schematically illustrated an apparatus capable of carrying out the process of this invention.

FIG. 2 is a graph representing the energy distribution of a short wave infrared heater employed in the process of this invention as compared with the radiation transmission characteristics of a known borosilicate glass.

In accordance with this invention, the heating of the glass body for thermal tempering purposes is accomplished by utilizing relatively shortwave infrared radiation. Most normal transparent glass, and particularly the common borosilicate glasses which are employed in the manufacture of laboratory and scientific glassware, are essentially opaque to conventional wavelength infrared energy, but are quite transparent to relatively short wave infrared radiation, to the extent of transmitting about 90 to 92 percent of such energy. This transparency means that energy absorption is taking place throughout the entire glass body rather than just at the glass surface. As a result, the entire glass body is uniformly heated, and substantially all portions of the glass body is uniformly heated, and substantially all portions of the glass body or glass article reaches a temperature above the strain point of the glass at the same time.

Figure 1:
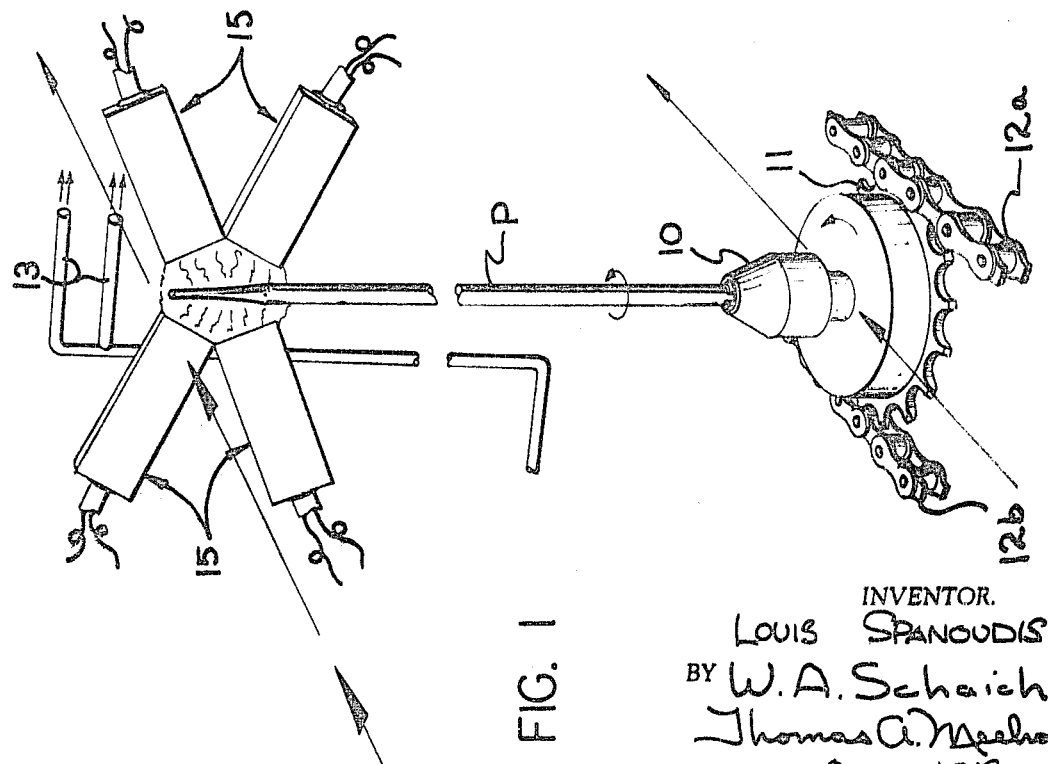
FIG. 1 is a schematic perspective view of an apparatus employed for effecting the thermal tempering of a glass pipette in accordance with the method of this invention.

Referring to FIG. 1, there is schematically shown an apparatus for effecting the thermal tempering of the tip of a borosilicate pipette P. Those skilled in the art will recognize that the wall portions of the pipette tips vary substantially in thickness, having a minimum thickness in the vicinity of the small end or tip of the pipette and increasing gradually in thickness as the diameter increases to the body of the pipette. Such pipette is mounted in an upright vertical position by insertion of the bottom portion thereof in a suitable chuck 10. Chuck 10 is in turn mounted on a transport gear 11 which is concurrently meshed with two spaced, parallel conveyor chains 12a and 12b. Relative movement of one of the chains with respect to the other will concurrently produce both a rotation of the chuck 10 and a linear translation of such chuck along the length of the slower moving chain.

A plurality of short wave, infrared heaters 15 are disposed along both sides of the path of the tip portion of the pipette P. For example, such heaters may comprise four units of model No. 5305X5-25A Strip Heaters and employ 5MT3/ICL quartz lamps, both sold by R. I. Controls Division of Research, Incorporated. The bulk of the infrared energy emitted by this type of lamp lies between the near infrared (0.7 microns) and about 3.0 microns.

With this arrangement, all portions of the tip of pipette P will be uniformly and rapidly heated in from 1 to 2 minutes to a temperature above the strain point of the glass of the pipette but well below the deformation temperature.

These facts are graphically illustrated in FIG. 2 on which the curve A represents the spectral output of a quartz lamp and curve B represents the spectral transmission of a common borosilicate glass marketed by Owens-Illinois, Inc., under the trademark "Kimble" and referred to as "Kimble N-51A" glass. The usual composition of this glass is:

| | |
|---|---|
| $SiO_2$ | 73.95 |
| $B_2O_3$ | 9.09 |
| $Al_2O_3$ | 5.42 |
| BaO | 2.91 |
| CaO | 0.91 |
| $Na_2O$ | 6.40 |
| $K_2O$ | 0.90 |

From FIG. 2, it will be seen that the bulk of the infrared energy output of the quartz lamps is substantially transmitted through the entire body of the N-51A glass pipette, with the result that the small portions of the short wave infrared energy that is absorbed by the glass, is absorbed throughout the entire thickness of those portions of the pipette through which the infrared radiation passes. As a result, the entire glass body, here the tip portions of the pipette, is uniformly heated in a relatively short time. Hence, all portions of the glass body subjected to the short wave infrared energy concurrently reach a temperature above the strain temperature of the glass, which for Kimble N-51A is approximately 535° C., and at this temperature there is no danger that the thin-walled portions of the pipette will be excessively heated so as to permit slumping or deformation of such portions.

Other glasses that may be tempered in accordance with this invention are glasses marketed by Owens-Illinois, Inc. and referred to as KG-33 and R-6 respectively.

When the desired amount of heating of the pipette tip portions is accomplished, the relative movement of the conveyor chains 12a and 12b is adjusted so as to rapidly translate the pipette chuck 10 to a second station where the heated tip portion of the pipette is subjected to cooling air blasts from the nozzles 13. In this manner, the tip portion of the glass pipette is thermally tempered to produce a substantial compressive stress on the surface portions of the tips.

Figure 3:
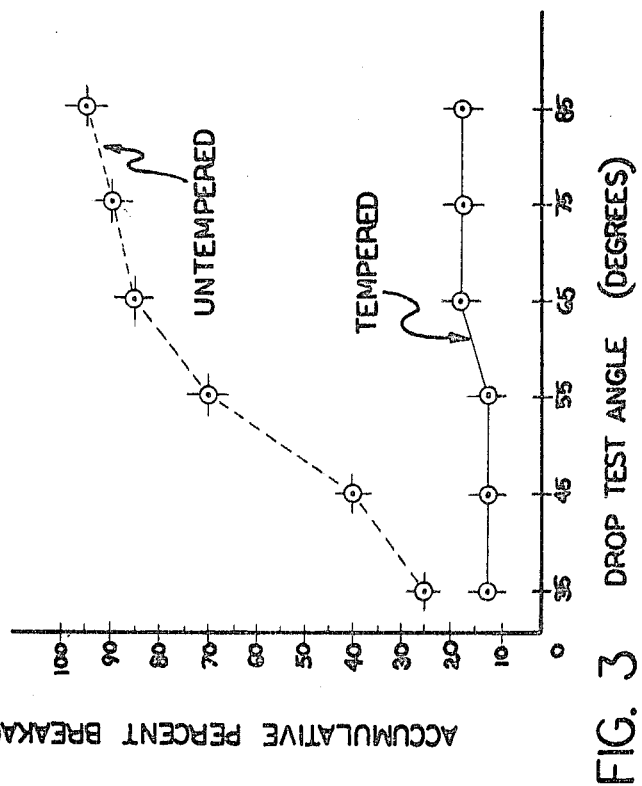
FIG. 3 is a chart illustrating the improved strength characteristics imparted to glass pipettes which have been thermally tempered in accordance with this invention.

Such compressive stress substantially increases the resistance of such parts to breakage as will be illustrated from the table shown in FIG. 3 which constitutes a summary of drop tests performed on pipettes with tips tempered in accordance with this invention and pipettes with no tempering.

In the event that it is desired to increase the heating rate of a particular glass article, while still employing the short wave infrared energy radiation heating method of this invention, such may be accomplished by coating those portions of the glass article for which an increased heating rate is desired with a surface layer of an infrared energy-absorbing material such as graphite or iron oxide. These coatings then act as black body absorbers of the infrared radiation, but, of course, also act as a black body emitter and since the coatings are in intimate contact with the glass, heat up of the glass will be accelerated.

Other modifications of this invention will be apparent to those skilled in the art, and it is intended that the true scope of this invention be determined solely by the scope of the appended claims.

I claim:
1. The method of thermally tempering a tubular body of glass having substantial wall thickness variations therein and comprising the steps of:
    1. forming said tubular body of glass from a selected borosilicate glass that is transparent to short wave infrared radiations and will transmit at least 90 percent of infrared radiations in the wavelength range of 0.7 microns to 3.0 microns,
    2. rotating the tubular body of glass while concurrently exposing same to a source of energy consisting essentially of infrared radiation having wavelengths in the wavelength range of 0.7 microns to 3.0 microns and thereby transmit at least 90 percent, but not all, of the infrared radiations in the wavelengths of 0.7 microns to 3.0 microns through the body of the glass, and the remaining portion of infrared radiations within said wavelength range being absorbed throughout the entire body of glass subjected to said radiation to thereby substantially uniformly heat all portions of the body of glass subjected to said radiations above the strain point temperature of said glass, but below the deformation point temperature thereof, whereby all portions of the glass body subjected to said radiations reach a temperature above the strain point of the glass at the same time;
    3. quenching the surface of the resulting heated tubular body of glass with a cooling fluid.

* * * * *

UNITED STATES PATENT OFFICE
CERTIFICATE OF CORRECTION

PATENT NO. : 3,620,706
DATED : November 16, 1971
INVENTOR(S) : Louis Spanoudis

It is certified that error appears in the above-identified patent and that said Letters Patent are hereby corrected as shown below:

Col. 1, lines 61 thru 62, after "body" delete "is uniformly heated, and substantially all portions of the body". Col. 2, line 6, after "path" insert --of movement--; Col. 2, line 8, change "5305X5-25A" to --5305-25A--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*